Nov. 16, 1965 W. M. HONIG 3,218,638

WIRELESS PASSIVE BIOLOGICAL TELEMETRY SYSTEM

Filed May 29, 1962 4 Sheets-Sheet 1

INVENTOR
WILLIAM M. HONIG
BY Darby & Darby
ATTORNEYS

WIRELESS PASSIVE BIOLOGICAL TELEMETRY SYSTEM

Filed May 29, 1962 4 Sheets-Sheet 2

INVENTOR
WILLIAM M. HONIG
BY Darby & Darby
ATTORNEYS

WIRELESS PASSIVE BIOLOGICAL TELEMETRY SYSTEM

Filed May 29, 1962 4 Sheets-Sheet 3

INVENTOR
WILLIAM M. HONIG
BY Darby & Darby
ATTORNEYS

Nov. 16, 1965 W. M. HONIG 3,218,638

WIRELESS PASSIVE BIOLOGICAL TELEMETRY SYSTEM

Filed May 29, 1962 4 Sheets-Sheet 4

INVENTOR
WILLIAM M. HONIG
BY Darby & Darby
ATTORNEYS

United States Patent Office 3,218,638
Patented Nov. 16, 1965

3,218,638
WIRELESS PASSIVE BIOLOGICAL TELEMETRY SYSTEM

William M. Honig, 2172 68th St., Brooklyn 4, N.Y.
Filed May 29, 1962, Ser. No. 198,483
2 Claims. (Cl. 343—6.5)

The present invention relates to passive telemetry systems particularly for biological voltage telemetry and more particularly to such a system comprising a sensing unit adapted to absorb and/or reradiate radio frequency signals, which sensing unit has a frequency characteristic variable in response to small biological voltages.

As medical and biological research progresses it becomes increasingly important to develop tools for observing internal biological phenomena with a minimum of disturbance or damage to the biological organism under study.

Numerous quantities or parameters may be desired to be measured, such as temperature, pressure, fluid flow or the like, but it is the principal purpose of the present invention to measure relatively small voltages such as are present in the nerve structure and elsewhere in biological organisms such as laboratory animals, humans, etc.

A particular example of such voltages which are of substantial interest are the nerve voltages which control the operation of the heart in humans and other higher animals. As a specific example, certain nerve voltages designated by biologists as EEG brain or nerve tissue voltages, EKG voltages appearing on the surface of the heart, or ECG voltages appearing on the surface of the heart may be the subject of study.

In previous studies of such nerve voltages in laboratory animals, such as dogs, it has been common to operate on the animal to insert electrodes in the nerve tissue and to lead conductor wires out through the surgical opening to the outside of the animal's body where they are available to allow measurement of the nerve voltages. Such a technique is understandably detrimental to the health of the animal, and its life expectancy is drastically shortened. Furthermore, the necessity for making connection to such conductor wires inhibits the freedom of the animal and limits the field of research accordingly. The latter limitation can be reduced somewhat by fastening a miniature radio transmitter on the outside of the animal's body to relay the biological voltages to a receiver which may be some distance away. However, even the presence of a small radio transmitter secured to the animal's body may inhibit its movements or alter its behavior so as to interfere with certain research problems. The possibility of placing a radio transmitter within the animal's body would appear to provide a solution to this problem but the difficulty of fabricating even a simple radio transmitter and power source in sufficiently small size is a most formidable one. In addition to which, the operability of the system would be limited to the length of life of the power source, which would necessarily be short.

The present invention provides a sensing cell for implantation within a biological organism and a telemetry system cooperating therewith, having the advantage that no power supply is required in the sensing cell, which is passive, and having the further advantage that biological voltages as low as from 1 to 30 millivolts may be telemetered from a sensing cell with a volume of not more than approximately $\frac{1}{25}$ of 1 cu. in. (or about the size of the rubber eraser on a wooden pencil).

It will be appreciated therefore that the telemetry system according to the present invention requires no wire connection to the biological organism under study nor is there any apparatus required to be connected externally to the organism which might limit its action or influence its behavior. The apparatus is further designed to minimize any effect of orientation of the cell so that its operation will be independent of movement of the laboratory animal or other organism.

While the immediate application of the apparatus is contemplated to be in research it is prospectively useful for diagnosis or for warning of malfunction. For example, a human patient with a history of heart malfunction could have a sensing cell implanted in the heart nerve to facilitate periodic checks of the heart function, or perhaps even a continual check arranged to summon assistance in the event of serious malfunction.

The apparatus may also be used connected to the voluntary nerve system to effect artificial control of some parameter by voluntary or controllable direction of a human subject.

In addition to providing the foregoing features and advantages it is an object of the present invention to provide a passive biological telemetry system capable of telemetering small biological voltages and which is susceptible of being implanted in an animal without detrimental effect.

It is another object of the present invention to provide such a telemetry system by which information is conveyed by variation of frequency response of an absorbing and retransmitting sensing cell.

It is still another object of the present invention to provide such a telemetry system wherein the sensing cell comprises a transformer to increase the magnitude of the biological voltages for operation of a voltage-sensitive reactance.

It is a still further object of the present invention to provide such a telemetry system having a ferrite antenna which is substantially non-directive in order that telemetry of signals from an unrestrained and active animal may be accomplished without regard to the orientation of the animal's body.

Other objects and advantages will be apparent from a consideration of the following description in conjunction with the appended drawings in which.

Figure 10:
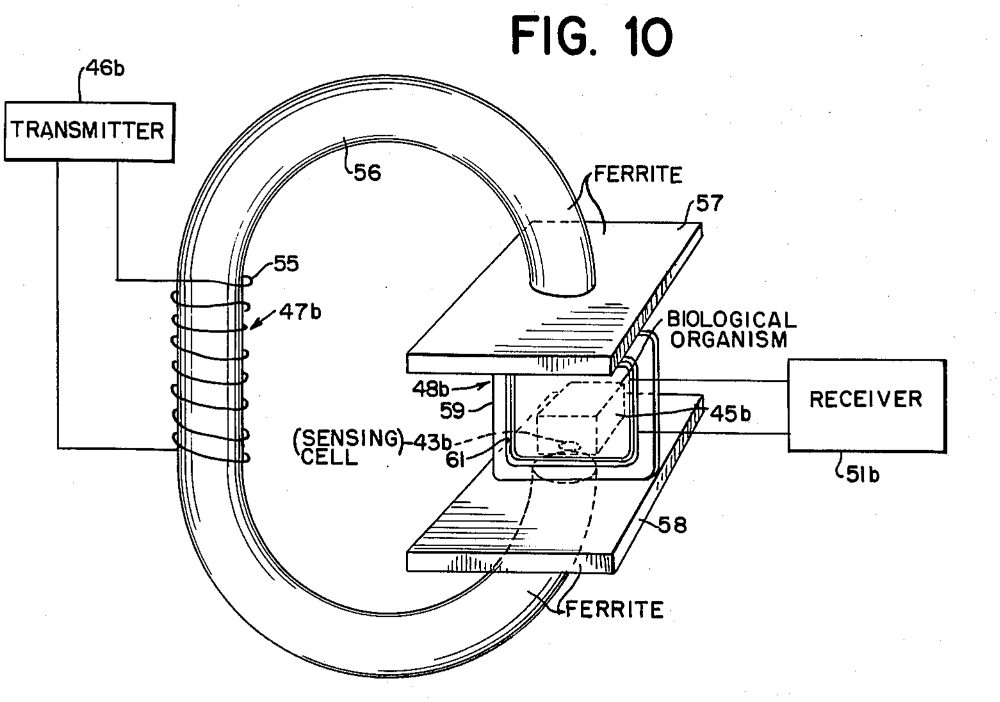

FIGURE 10 is an isometric view, partially schematic, showing an alternative form of transmitting and receiving antenna incorporated in a telemetry system according to the present invention; and FIGURES 11*a* through 11*h* are wave form diagrams of biological voltage waveforms and further waveforms derived therefrom by the present invention which are useful in explanation of the operation of the invention.

Figure 1:
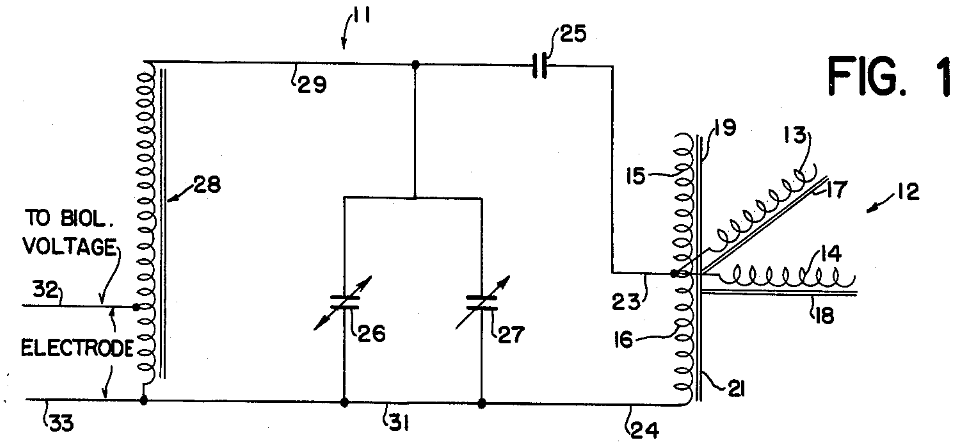
FIGURE 1 is a schematic electrical circuit diagram of a sensing cell according to the present invention.

FIGURE 1 shows a particular form of circuit for the sensing cell used in the present invention which will be described by way of illustration. The sensing cell circuit 11 comprises an antenna 12. Antenna 12 is preferably a ferrite or similar miniaturized antenna and comprises three mutually orthogonal helical coils 13, 14 and 15 wound respectively on ferrite arms 17, 18 and 19.

The mutually perpendicular arms 17, 18 and 19 are joined at one end to a fourth common arm. Similarly coils 13, 14 and 15 are joined at one end and merge into coil 16 which is wound around ferrite arm 21. Coil 16 may comprise for example 2 to 20 turns of copper wire (No. 30 to No. 44) and coils 13, 14 and 15 may each have approximately ten times the number of turns as does coil 16. Antenna leads 23 and 24 may be connected to respective ends of coil 16.

Antenna 12 is connected by leads 23 and 24 to an electrically variable capacitance element 26. A blocking capacitor 25 is connected in series in lead 23 and a trimming capacitor 27 is connected in parallel with electrically variable capacitor 26.

The electrically variable capacitor 26 may be a ferroelectric capacitor, a variable capacitor sold under the trade name Varicap, or the equivalent. Such electrically variable capacitance element will have a substantial capacitance variation when its terminals are subjected to a voltage on the order of 100 to 3000 millivolts.

It will be noted that the circuit thus far described comprises a tuned antenna circuit including capacitances 25, 26, and 27 and the inductances of the antenna 12 together with whatever resistance may be present in the various elements. The major portion of the capacitance of the circuit is provided by capacitor 26 and is variable by virtue of an electrical potential introduced across the terminals of capacitor 26. Accordingly the antenna circuit has an electrically variable resonant frequency (which may be centered about a frequency on the order of 10 megacycles).

Capacitor 27 is utilized to adjust the frequency of operation and capacitor 25 is a convenient means of blocking the low frequency control voltages so that they will not be dissipated in coil 16 but rather will be substantially fully imparted to electrically variable capacitor 26.

Control voltages for electrically variable capacitor 26 are provided through leads 29 and 31 from an autotransformer 28, the physical structure of which will be more fully described hereinafter. The input to autotransformer 28 is through electrodes 32 and 33 which may be fine silver or platinum wires or other probes suitable for introduction into animal tissue or nerves to detect biological voltages. If desired an R.F. choke coil or isolation resistor may be inserted in lead 29 to minimize loading of the antenna circuit by the capacitance of the transformer 28.

Selected biological voltages, which may be in the range of 1 to 30 millivolts and have durations of from 1 to 500 milliseconds, cause a voltage to be presented across electrodes 32 and 33. This voltage is increased approximately 100 times by autotransformer 28 and applied across the terminals of variable capacitor 26. The capacitance of electrically variable capacitor 26 is substantially varied by the voltage from transformer 28 which in turn substantially varies the resonant frequency of antenna 12.

It is well known that an antenna, even though unconnected to any power source, nevertheless absorbs and reradiates energy impinging thereon. The degree of such absorption or radiation naturally is affected by the correspondence between the resonant frequency of the antenna 12 and the frequency of the radio frequency energy impinging on it. Thus there are numerous techniques by which the resonant frequency of antenna 12 may be detected by its absorption and/or reradiation of electromagnetic energy and thus obtain a measure of the voltage at electrodes 32 and 33.

It may be noted that temperature sensitivity of elements in the tuning circuit of antenna 12 will only produce very slow variations in its resonant frequency which may readily be distinguished from the pulses originating from electrodes 32 and 33. Such temperature sensitivity may be intentionally incorporated to provide a temperature measurement with substantially no increase in apparatus complexity.

Figure 2:
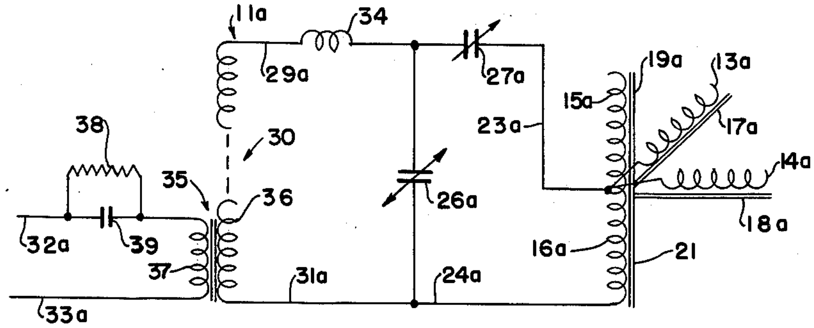
FIGURE 2 is a schematic electrical circuit diagram of an alternative electrical circuit for a sensing cell according to the present invention.

An alternative form of apparatus is shown in FIGURE 2 which differs from that of FIGURE 1 in several respects. Corresponding elements in FIGURE 2 are given the same reference number as in FIGURE 1 except for the addition of the suffix *a*. Capacitor 27*a* serves both as a blocking capacitor and as a fine tuning or trimming capacitor. A choke coil 34 (or isolation resistor) is inserted in the low frequency circuit of FIGURE 2 to isolate this circuit from the radio frequency circuit including antenna 12*a*.

The transformer 30 in FIGURE 2 has separate primary and secondary windings rather than being an autotransformer as indicated in FIGURE 1. Transformer 30 comprises a secondary winding 36, a core 35 and a primary winding 37. The turns ratio of transformer 30 may be approximately 100 to 1.

The primary circuit of transformer 30 is provided with a resistor 38 and a capacitor 39 and is particularly useful with high impedance biological tissue. The operation of the circuit of FIGURE 2 is generally the same as that of FIGURE 1. The biological voltages which are applied to electrodes 32*a* and 33*a* and hence to the stepup transformer 30 lie in the 1 to 30 millivolt range with durations of 1 to 50 milliseconds. The output voltage of transformer 30 is 100 times the input voltage. The output voltage from transformer 30 is applied to the electrically variable capacitance 26*a*. The capacitance of this component varies with the voltage applied to it and has a characteristic such that 100 to 3000 millivolts is adequate to cause appreciable capacitance change. The capacitor 26*a* forms most of the capacitance of the radio frequency tuned circuit including antenna 12*a*. The inductance of the circuit is provided by the antenna 12*a*.

Trimmer capacitor 27*a* may be used to adjust a frequency range of operation and is used to block the low frequency voltage from the radio frequency inductance and antenna 12 so that the full low frequency output voltage may be utilized across capacitor 26. A choke coil is utilized in the circuit of transformer 30 to prevent the radio frequency from being loaded by the low R.F. impedance of secondary winding 36.

In addition to the two specific circuits illustrated, it will be appreciated that other modifications may be made, and features of the two circuits may be interchanged such as by utilizing an autotransformer in the apparatus of FIGURE 2 or by employing choke coil 34 in FIGURE 1, etc.

Figure 3:
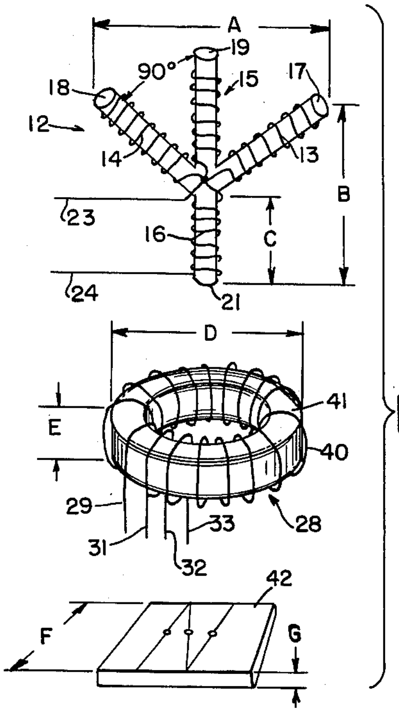
FIGURE 3 is an exploded view of the structure of a sensing cell according to the present invention.

The physical structure of the sensing cell is illustrated in FIGURE 3. The antenna 12 consists of three mutually perpendicular ferrite arms 17, 18 and 19 joined at one end to a common base arm 21. Approximately 2 to 20 turns of copper wire which may be of gage number 30 to 34 are helically wound on the base arm 21 and split into 3 leads forming coils 13, 14 and 15, helically wound respectively on arms 17, 18 and 19. Each coil 13, 14 and 15 may have 10 times the number of turns as coil 16.

Figure 5:
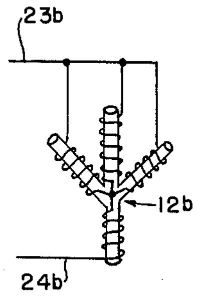
FIGURE 5 is an isometric view of an alternative form of sensing cell antenna according to the present invention.

Alternatively antenna 12 may be wound as illustrated in FIGURE 5 where windings 13*b*, 14*b* and 15*b* are connected at the extreme ends of arms 17, 18 and 19 to an output lead 23*b*. This is in contrast to the arrangement of FIGURE 3 in which output lead 23 is connected to the junction of coils 13, 14 and 15. In both cases output lead 24 (or 24*b*) is connected to the extreme end of base winding 16.

Antenna 12 provides a very compact but relatively efficient antenna or magnetic coupler which is substantially nondirectional and thus will not cause variations in the response of the sensing cell as its orientation is changed by virtue of movement of the animal in which it is implanted. Antenna 12 may be further improved by providing further ferrite material and/or high dielectric constant material (e.g. titanates) over windings 13, 14 and 15 which may be in the form of a sleeve or otherwise arranged to improve the performance of the antenna coil and hence compensate for its small size relative to the free-space radiation wavelength.

Transformer 28 comprises a toroidal core which may be formed of Permalloy or Supermalloy and provided with laminations or the equivalent. The lamination or equivalent construction may be provided by forming the core of laminar rings or by a tape wound construction.

The winding of core 28 may be formed of tungsten or platinum wire of gage No. 42 to No. 56, which wire is provided with a refractory insulating coating. The transformer secondary may typically consist of 2000 to 3000 turns. The primary may consist of approximately one one-hundredth of this number of turns and may preferably be of wire gage No. 35 to No. 40.

The transformer 28 provides a remarkable efficiency in a very small size and is an important aspect of the invention. A transformer such as 28 may find uses other than in the telemetry apparatus according to the present invention. It will be noted that the transformer is formed of materials which are throughout extremely resistant to high temperatures. This makes possible a novel fabrication process for the transformer in which the unit is completely assembled prior to being exposed to a high temperature (above 1000° C.) annealing and reduction heat treating cycle.

The capacitive and resistive circuit elements of the circuit of FIGURE 1 or 2 are of the miniaturized type and mounted on a circuit board 42.

Figure 4:
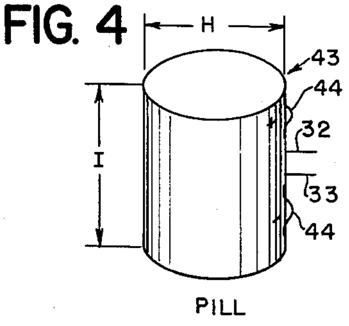
FIGURE 4 is an isometric view of an assembled sensing cell according to the present invention.

The elements of FIGURE 3 are assembled and encapsulated in suitable potting compound to form an assembly as illustrated in the FIGURE 4. The capsule 43 is formed of a material which may be implanted in living tissue without deleterious effect such as glass, plastic (such as synthetic rubber), silver, platinum or the like; or the potting compound itself may form the capsule if it does not create unfavorable reactions when implanted in living tissue. Suture loops 44 are provided on the capsule for securing it in place in the organism and electrodes 32 and 33 extend from the capsule.

Figure 6:
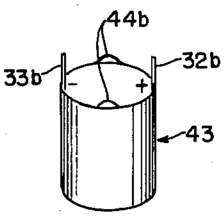
FIGURE 6 is an isometric view of an alternative form of encapsulation for a sensing cell according to the present invention.

An alternative arrangement is shown in FIGURE 6 in which electrodes 32*b* and 33*b* extend from the end of the capsule rather than the side and the suture loops 42*b* are likewise attached to the end of the capsule. Electrodes 32 and 33 may be sutured in place or can pierce the tissue which is to be monitored.

Typical dimensions for the sensing cell and its components are given in Table I below. The dimensions given are achievable with substantial design margin and thus may be expected to be diminished still further by design refinement.

*Table I*

| Approx. maximum dimension | Inches |
|---|---|
| A | 3/16 |
| B | 3/8 |
| C | 3/32 |
| D | .28 |
| E | .20 |
| F | .15 |
| G | .10 |
| H | 1/4 |
| I | 3/8–5/8 |

Figure 7:
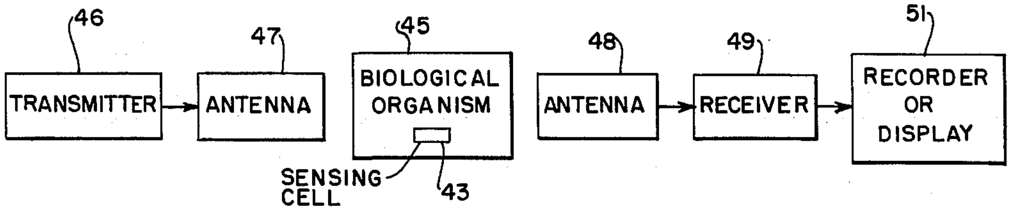
FIGURE 7 is a block diagram of a telemetry system according to the present invention.

The cooperation of the remote portion of the telemetry system with sensing cell 43 is illustrated in FIGURE 7. Sensing cell 43 is implanted in a biological organism 45 which may be considered for the purpose of example to be a dog. The electrodes from sensing cell 43 are placed to sense biological voltages of the dog's heart control nerves, for example.

A transmitter 46 having an antenna 47 is arranged in proximity to the biological organism 45 and the transmitter transmits frequencies in the range of response of the sensing cell 43. A transmitter power of 100 watts may be provided. A receiver 49 having an antenna 48 is also placed in the vicinity of the biological organism 45 in such a way as to detect the signals which are absorbed and retransmitted by sensing cell 43. As is well known, a tuned antenna such as that in the sensing cell 43 will absorb and retransmit an electromagnetic signal of the frequency to which it is tuned in a manner very analogous to that in which a tuning fork is caused to resonate by an impinging sound wave near its resonant frequency; the tuned antenna, like the tuning fork, re-radiates the absorbed energy. A recorder 51 is provided to record and/or display signals from receiver 49 either directly or after suitable modification. Since the sensing cell 43 has a frequency response which varies according to the biological voltage, information with respect to such biological voltages is telemetered from sensing cell 43 to recorder 51.

Figure 8:
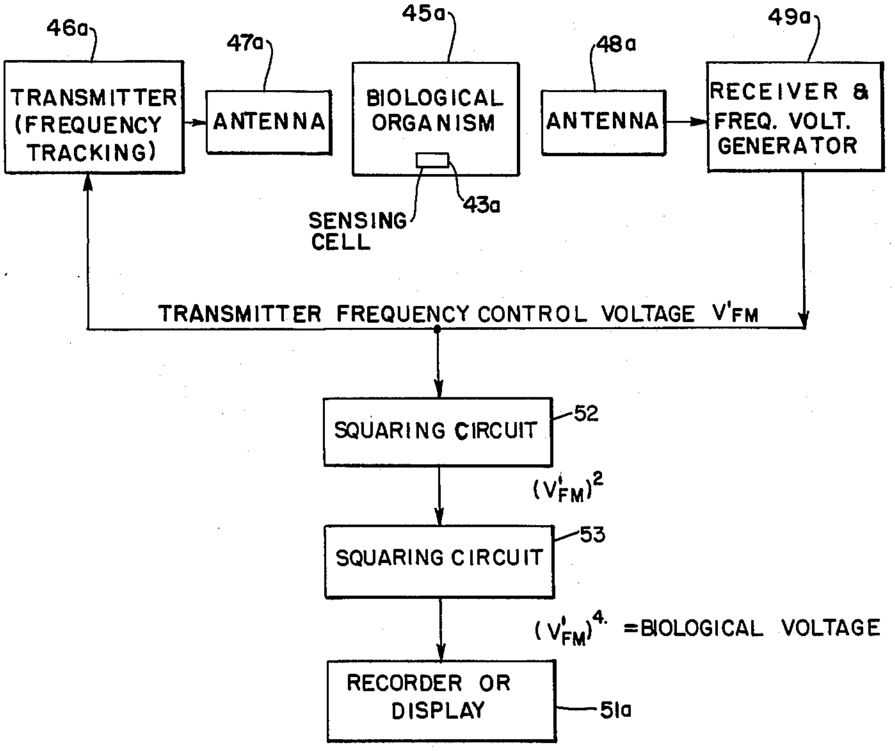
FIGURE 8 is a block diagram of an alternative form of telemetry system according to the present invention.

FIGURE 8 shows an alternative telemetry system in which the remote apparatus is somewhat more elaborate. Related elements in FIGURE 8 are given the same reference number as in FIGURE 7 except for the addition of the suffix letter *a*. The sensing cell 43*a* is implanted in a biological organism 45*a* at which radio energy is directed by a transmitter 46*a* having an antenna 47*a*. The transmitter 46*a* is a frequency tracking transmitter as will later be more fully explained. Radio frequency energy from sensing cell 43*a* is received by an antenna 48*a* and connected to a receiver 49*a*. The receiver 49*a* produces an output voltage responsive to the frequency received by the receiver. Receiver 49*a* may for example be a frequency modulation receiver and the voltage may be produced by the FM discriminator and be substantially proportional to the frequency deviation from a predetermined midfrequency.

The frequency responsive voltage from receiver 49*a* is transmitted to transmitter 46*a* which is thereby controlled to produce substantially the same frequency. Thus the transmitter 46*a* in effect tracks the resonant frequency of sensing cell 43*a*.

The frequency responsive voltage from receiver 49*a* is also directed to a pair of squaring circuits 52 and 53 connected in tandem so that the output from squaring circuit 53 is the fourth power of the frequency deviation. As will later be more fully explained, this fourth power voltage is substantially proportional to the biological voltage. The output from squaring circuit 53 is transmitted to a recorder or display 51*a* for direct indication of the biological voltage.

A typical operating frequency for the telemetry apparatus of FIGURES 7 and 8 will be between 6.5 and 13 megacycles. While it might be expected that miniaturized telemetry might benefit by use of higher frequencies, the present invention makes advantageous use of frequency ranges which are low enough for efficient penetration of animal tissue and high enough to be adequately received by a miniature antenna-coupling element.

Figure 9:
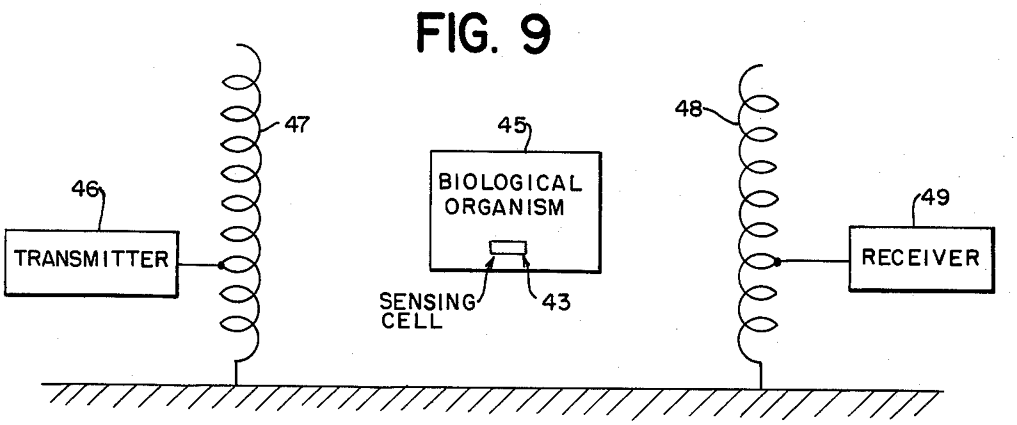
FIGURE 9 is a schematic illustration of a telemetry system according to the present invention, particularly illustrating the transmitting and receiving antennas.

Suitable remote transmitter and receiver antennas are illustrated in FIGURE 9 in which the same reference numbers are utilized as in block diagram FIGURE 7. In FIGURE 9 separate antennas 47 and 48 are utilized for transmitting and receiving although it will be appreciated that in certain instances the same antenna might be used. (For example, the transmitter may be pulsed to "ring" the resonant antenna, and the information then received after the transmitter pulse and before decay of the antenna resonance.) Each of the antennas 47 and 48 comprises a copper wire or tubing which may have a diameter of approximately one-quarter inch. The wire or tubing is wound in helical shape a helix diameter of not less than approximately 5″. The helix may have a length of approximately two or three feet and the pitch of the helix may be approximately ⅓″. Thus separate helical monopole transmitter and receiver antennas are provided and are oriented as illustrated in FIGURE 9.

FIGURE 10 shows an alternative antenna arrangement in which the receiver antenna is decoupled from the transmitter antenna for direct transmissions therebetween by virtue of its plane of orientation in the transmitted electromagnetic field.

In the apparatus of FIGURE 10 the radio frequency output of transmitter *46b* is connected to a ferrite antenna *47b* having a C-shaped core 56 wound with many turns 55 (for example 100 turns) of conductor wire.

The ends of the C-shaped core 56 terminate in plates 57 and 58 also of ferrite material. The biological organism *45b* is located between plates 57 and 58 and the sensing cell *43b* is, as before, implanted in the biological organism *45b*.

The receiving antenna *48b* may also be located between plates 57 and 58 or in any event not far distant from the organism *45b*. Antenna *48b* comprises a number of turns of wire forming a loop 61 which may be mounted on a nonconductive panel 59. The loop antenna 61 is connected to receiver *51b*.

It will be noted that loop 61 has directional sensitivity and is arranged to minimize direct coupling between the transmitting and receiving antenna. On the other hand, radio frequency energy absorbed and retransmitted by sensing cell *43b* is efficiently received by receiver antenna *48b*.

The form in which the telemetered information is carried by the signal received by receiver 49 is subject to considerable variation by control of the transmitter frequency and/or modulation. Several variations are illustrated in FIGURES 11*a* through 11*h*.

Figure 11A:
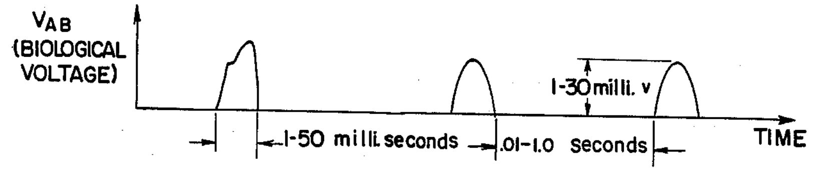

FIGURE 11*a* illustrates typical voltage pulses such as occur in the heart impulse conduction fibers of higher animals.

Figure 11B:
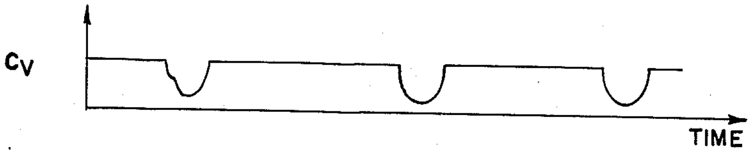
Figure 11C:
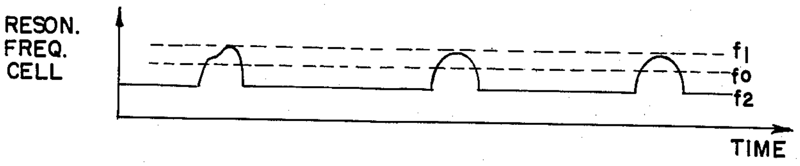

According to the invention, these voltages are increased in magnitude by a transformer such as 28 and applied to vary the capacitance of an electrically variable capacitor such as 26. Capacitance variation resulting from the pulses of FIGURE 11*a* is illustrated in graphic form in FIGURE 11*b*. The various waveforms are not intended to be to scale; it should be pointed out that in a typical case the capacitance varies inversely as the square root of the voltage variation. The resonant frequency deviation of the sensing cell may be considered to be dependent only on the capacitance change of the electrically variable capacitor. As illustrated in FIGURES 11*a* to 11*c*, a biological voltage of arbitrary wave shape will be caused to produce a varied capacitance for the variable capacitor which is approximately inversely proportional to the square root of the biological voltage (the illustrations given are not intended to rigorously represent the exact relations between the signals). The resonant frequency bears an inverse square root relation to capacitance and hence a fourth root relation to biological voltage.

Figure 11D:
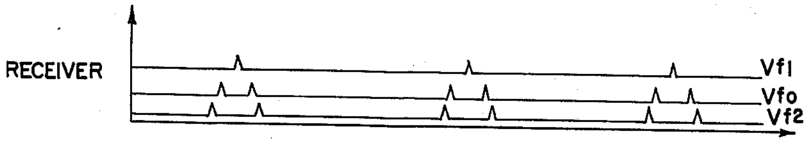

The transmitter 46 may have a narrow band output frequency which is adjusted to a value within the resonance frequency range of the sensing cell antenna. FIGURES 11*c* and 11*d* illustrate the different signals received at the receiver for different relationships of transmitter frequency and sensing cell antenna resonant frequency. For example, the transmitter may be adjusted to operate at a frequency indicated at $f_0$ at FIGURE 11*c* which is substantially in the middle of the sensing cell antenna resonant frequency range. For this frequency relationship two pulses occur as illustrated at $V_{f_0}$ in FIGURE 11*d* for each wave of the original signal being telemetered.

The same result accrues for operation at frequency $f_2$ except that the pulses are slightly wider spaced. For operation at frequency $f_1$ only one pulse is produced at the receiver for each pulse of the telemetered signal.

It should be noted that the system described herein operates by virtue of retransmission by the sensing cell antenna. However, the absorption of the sensing cell antenna could also be utilized by monitoring the decrease in power received from the transmitting antenna.

Figure 11E:
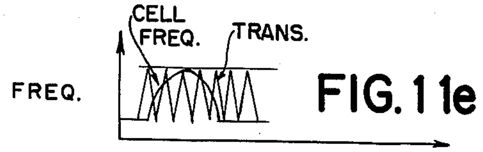

The transmitter may also be arranged to periodically transmit at different frequencies, for example, it may be swept rapidly through the sensing cell resonant frequencies as illustrated in FIGURE 11*e*. For example, the sweep period of the transmitter may be from ⅕ to 1/100th of the average expected biological pulse duration.

Figure 11F:
Figure 11G:
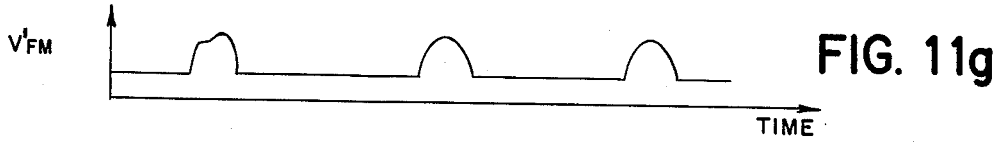
Figure 11H:
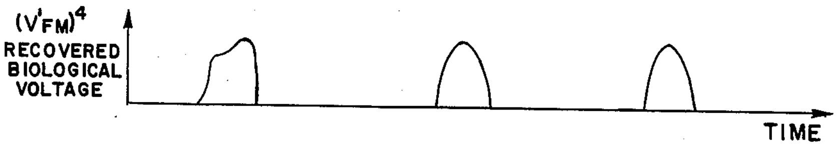

With with the transmitter modulation illustrated in FIGURE 11*e*, it will be advantageous to use a frequency modulation receiver which will produce a responsive waveform approximately as shown in FIGURE 11*f*, thus providing an approximate reconstruction of the original biological voltage which may be even better reconstructed by further signal processing.

As explained with reference to FIGURE 8, the transmitted frequency may be controlled by the receiver so that it will always seek the resonant frequency of the sensing cell. In such a system the output of the FM discriminator will be substantially proportional to the resonant frequency of the sensing cell. In the case of the usual electrically variable capacitance the frequency is proportional to the fourth root of the biological voltage. Thus the biological voltage waveform may be recovered by passing the frequency voltage signal from the receiver (illustrated in FIGURE 11*g*) through two successive squaring circuits to reconstruct the original biological voltage waveform. See FIGURE 11*h*.

In all cases the waveforms are not intended to be exact but are simplified for the purpose of explanation.

From the foregoing description and explanation it will be apparent that the present invention provides a passive biological telemetry system which is adaptable to use a very small sensing cell which may be implanted in a biological organism, and advantages heretofore impossible to obtain may be accomplished by use of the present system.

Numerous variations and modifications of the particular systems shown and suggested will be apparent to those of ordinary skill in the art. It is accordingly desired that the scope of the present invention not be limited to those particular forms shown or suggested but that it be defined by reference to the appended claims.

What is claimed is:

1. Passive telemetry apparatus comprising a passive sensing cell including a ferrite antenna having three substantially mutually perpendicular arms, an electrically variable capacitance element connected to said antenna to cause the frequency response of said antenna to vary in accordance with the capacitance value of said capacitance element, a transformer connected to said capcitance element, said transformer having at least a ten to one turns ratio with a high voltage side of said transformer connected to said capacitance element and the low voltage side connected to leads to receive an electrical signal to be sensed, means in said antenna circuit for blocking the relatively low frequency signals from said transformer, and means in circuit with said transformer for blocking the radio frequency signals from said antenna; a radio frequency transmitter having a frequency range including the frequency response to said antenna; a radio frequency receiver arranged to receive signals transmitted by said transmitter and altered by reception by said antenna; means coupled to receive signals from said receiver for detecting the instantaneous frequency response of said antenna; and an indicator coupled to said detecting means for providing a direct indication of a condition represented by the voltage at said transformer input leads.

2. Apparatus as claimed in claim 1 wherein the frequency response of said antenna is within the range of approximately 0.2 megacycles to 100 megacycles.

References Cited by the Examiner

UNITED STATES PATENTS

| | | | |
|---|---|---|---|
| 1,531,681 | 3/1925 | Auty | 29—155.57 |
| 1,722,362 | 7/1929 | Wiley | 29—155.57 |
| 2,265,666 | 12/1941 | Mekelburg | 336—61 |
| 2,408,695 | 10/1946 | Sinnett et al. | 343—100.10 |
| 2,769,962 | 11/1956 | Melville | 336—61 |
| 2,818,732 | 1/1958 | Bennett | 128—2.1 X |
| 2,958,781 | 11/1960 | Marchal | 128—2.1 X |
| 3,051,896 | 8/1962 | Bieganski | 128—2.1 X |
| 3,052,232 | 9/1962 | Zworykin | 128—2.1 |
| 3,052,233 | 9/1962 | Veling | 128—2.1 |

OTHER REFERENCES

Antennas and Radio Propagation, Dept. of the Army Technical Manual TM 11-666, page 132, February 1953. Government Printing Office.

Haynes "Medical Electronics," pp. 52-54 of RCA Engineer, vol. 5, No. 5, February-March 1960. 128-419.

Science, page 1814, June 1960. 128—2.1 X.

CHESTER L. JUSTUS, *Primary Examiner.*

RICHARD J. HOFFMAN, JORDAN FRANKLIN, LOUIS R. PRINCE, *Examiners.*